United States Patent
Song (10) Patent No.: US 12,548,001 B2
(45) Date of Patent: Feb. 10, 2026

(54) SYSTEM FOR BLOCKCHAIN-BASED SHARE SUBSTANTIAL TRADE FOR OWNER UNSPECIFIED COMMON ASSET AND METHOD THEREFOR

(71) Applicant: Eun Ha Song, Seoul (KR)

(72) Inventor: Eun Ha Song, Seoul (KR)

(*) Notice: Subject to any disclaimer, the term of this patent is extended or adjusted under 35 U.S.C. 154(b) by 100 days.

(21) Appl. No.: 17/916,999

(22) PCT Filed: Apr. 6, 2021

(86) PCT No.: PCT/KR2021/004287
§ 371 (c)(1),
(2) Date: Oct. 4, 2022

(87) PCT Pub. No.: WO2021/206424
PCT Pub. Date: Oct. 14, 2021

(65) Prior Publication Data
US 2023/0169479 A1    Jun. 1, 2023

(30) Foreign Application Priority Data
Apr. 7, 2020    (KR) .......................... 10-2020-0041960

(51) Int. Cl.
*G06Q 20/12* (2012.01)
*G06Q 20/36* (2012.01)
*G06Q 20/38* (2012.01)

(52) U.S. Cl.
CPC ..... *G06Q 20/1235* (2013.01); *G06Q 20/3678* (2013.01); *G06Q 20/381* (2013.01);
(Continued)

(58) Field of Classification Search
CPC ........... G06Q 20/1235; G06Q 20/3678; G06Q 20/381; G06Q 20/3827; G06Q 20/389; G06Q 2220/00
See application file for complete search history.

(56) References Cited

U.S. PATENT DOCUMENTS 11,200,569 B1* 12/2021 James .................. G06Q 20/381
11,334,883 B1* 5/2022 Auerbach ............ G06Q 20/223
(Continued)

FOREIGN PATENT DOCUMENTS

JP    2020027592 A    2/2020
JP    2020053082 A    4/2020
(Continued)

OTHER PUBLICATIONS

Welcome to the Moon!, Jan. 8, 2019, International Lunar Land Registry, pp. 1-2 (Year: 2019).*
(Continued)

*Primary Examiner* — Nilesh B Khatri
(74) *Attorney, Agent, or Firm* — Renaissance IP Law Group LLP (57) ABSTRACT

The present inventive concept relates to a system for a blockchain-based share substantial trade for an owner unspecified common asset and a method therefor, the system and the method allowing trade parties to perform a trade, on the basis of blockchain, for the share of a common asset for which no owner can be specified or ownership does not exist, by using tokens, and to exchange for cash the tokens used in the trade, so as to substantially trade the share of the common asset.

6 Claims, 7 Drawing Sheets

(52) U.S. Cl.
CPC ....... *G06Q 20/3827* (2013.01); *G06Q 20/389* (2013.01); *G06Q 2220/00* (2013.01)

(56) References Cited

U.S. PATENT DOCUMENTS

| | | | |
|---|---|---|---|
| 12,148,025 B1* | 11/2024 | Schwarz, Jr. | G06F 16/27 |
| 2002/0178097 A1* | 11/2002 | Snow | G06Q 10/043 |
| | | | 705/35 |
| 2007/0198421 A1* | 8/2007 | Muller | G06Q 20/1235 |
| | | | 705/52 |
| 2015/0081589 A1* | 3/2015 | RovelleQuartz | G06Q 40/06 |
| | | | 705/36 R |
| 2019/0080407 A1* | 3/2019 | Molinari | H04L 9/3239 |
| 2019/0095995 A1* | 3/2019 | Rohlfs | G06Q 40/04 |
| 2019/0197622 A1* | 6/2019 | Molinari | G06Q 20/06 |
| 2019/0385236 A1* | 12/2019 | McConnell | H04L 9/50 |
| 2020/0184431 A1* | 6/2020 | Sinmao | G06Q 20/389 |
| 2021/0248594 A1* | 8/2021 | Yantis | G06Q 20/389 |
| 2021/0319510 A1* | 10/2021 | Lee | H04L 9/50 |

FOREIGN PATENT DOCUMENTS

| | | |
|---|---|---|
| KR | 20180113145 A | 10/2018 |
| KR | 20190057909 A | 5/2019 |
| KR | 20190127512 A | 11/2019 |
| KR | 20190138295 A | 12/2019 |
| KR | 20200031264 A | 3/2020 |
| KR | 102157171 B1 | 9/2020 |

OTHER PUBLICATIONS

International Lunar Land Registry, Jan. 8, 2019, pp. 1-2 (Year: 2019).*
Satoshi Nakamoto, Bitcoin: A Peer-to-Peer Electronic Cash System, Oct. 31, 2008, pp. 1-9 (Year: 2008).*
International Search Report for PCT/KR2021/004287, mailed Jul. 12, 2021.

* cited by examiner

SYSTEM FOR BLOCKCHAIN-BASED SHARE SUBSTANTIAL TRADE FOR OWNER UNSPECIFIED COMMON ASSET AND METHOD THEREFOR

TECHNICAL FIELD

The present inventive concept relates to a system for a blockchain-based share substantial trade for an owner unspecified common asset and a method therefor, the system and the method allowing trade parties to perform a trade, on the basis of a blockchain, for the share of a common asset for which no owner can be specified or ownership does not present, by using tokens, and to exchange for cash the tokens used in the trade, so as to substantially trade the share of the common asset.

BACKGROUND ART

Among the assets currently on Earth, some of *Antarctica*, Arctic, and deep-sea floor are common heritages of mankind that cannot be owned by any specific country or company. They are assets that are jointly owned because there is no other alternative to grant ownership to a specific person. This phenomenon is also present in parts of the Earth as well as other planets, including the Moon and Mars.

As such, there are no clear plans or countermeasures for how to recognize, register, and manage human assets that are difficult to identify or have no ownership of assets, and thereby there is no proper way to utilize an asset whose owner cannot be specified or whose ownership does not exist.

But since useless assets are rare on Earth, countries around the world are engaged in a silent war over the common heritage of mankind for which there is no specific management system for ownership. For example, although there is no ostensible claim of ownership due to international treaties in the case of assets that cannot be identified or have no ownership, which have been confirmed to be the treasury of mineral and fish resources, countries around the world are fighting for taking even a little more share.

However, since mankind believes that common assets can be freely used by anyone, pursuing only their own interests will lead to catastrophe. To avoid the catastrophe, it is necessary to introduce an appropriate system for privatization or sharing of common assets.

The present inventive concept was devised to solve these problems, and intends to suggest a method in which trade parties can freely perform transaction based on the blockchain with respect to the share of common assets.

In particular, the present inventive concept allows the trade parties to perform transaction based on the blockchain by using tokens for the share of the common asset, and enables the tokens used in the transaction to be exchanged for cash, and thus suggesting a way to make the shares of the common assets practically tradeable.

That is, the present inventive concept presents a system and a method allowing shares to be obtained by legitimately transacting through a trust system via a blockchain, for the shares of some common assets of mankind in which an owner cannot be specified or ownership does not exist, and other common assets related to seized goods that the government publicly sells to the public.

Hereinafter, the prior arts existing in the technical field of the present inventive concept will be briefly described, and then the technical matters that the present inventive concept intends to achieve differently from the prior arts will be described.

First, Korean Patent Publication No. 2019-0138295 (Dec. 12, 2019) relates to a real estate transaction method and system through electronic money issuance, and the technical feature of the prior art is to enable the real estate owner to convert and issue the value of real estate or real estate development value (e.g., the value increased by equipment, extension, development, etc.) into electronic money and to use the money.

That is, the prior art describes a system and method in which enable real estate owners to secure liquidity for funds tied to real estate through electronic money, and thereby increasing the development of the real estate, facility investment, and consumption.

However, the present inventive concept utilizes a blockchain technology to allow trade parties to freely trade shares of common assets that cannot identify ownership or have no ownership, which is different from the prior art that converts and issues the value of real estate into electronic money and secures liquidity for funds tied to real estate, and thus allows the trade parties to be recognized from the public for the ownership of shares of the common assets by transacting the shares of the common assets through tokens.

Therefore, it will be obvious that the technical feature of the present inventive concept of the trade parties transacting the share of the common asset based on a blockchain cannot be inferred through the prior art.

In addition, Korea Patent Publication No. 2018-0113145 (Oct. 15, 2018) relates to a blockchain-based real-time transaction processing method and system, of which the technical feature is to provide real-time transaction processing services based on blockchain without structural changes to the blockchain network.

That is, the prior art presents a method and system that can reduce the time required for transaction confirmation in a blockchain network, by reducing a block generation time.

However, the prior art which is to reduce the time required for transaction confirmation in the blockchain network, is completely different from the present inventive concept that allows trade parties to be recognized for the ownership for a share of the common asset by whom the trade parties perform a transaction using the blockchain technology with respect to the share of the common asset.

DISCLOSURE

Technical Problem

The present inventive concept was created to solve the above problems, it is objective to provide a system and a method for trade parties to trade using tokens for shares of common assets of which ownership cannot be identified or does not exist.

It is another objective of the present inventive concept to present a system and a method for trading the shares of the common assets through tokens, and exchanging the tokens used for the trade of the shares for cash.

It is another objective of the present inventive concept to present a system and a method for obtaining recognition of public confidence in the ownership of each share of the common asset, by generating a block including transaction information for the trade, connecting the generated block to the previously generated block with chains, and propagating the generated block to other blockchain nodes to share the generated block, when trading the share of the common asset.

It is another objective of the present inventive concept to provide a system and a method for performing transactions for shares of common assets related to an area such as a planet comprising the moon or Mars, or the South Pole, the North Pole, deep-sea or out-sea, or seized goods that are publicly sold by the government to the public.

Technical Solution

A system for a blockchain-based share substantial trade for an owner unspecified common asset in accordance with an embodiment of the present inventive concept is characterized in comprising: a contract unit configured to contracting for a share among a plurality of shares split by the common asset of which an owner cannot be specified, or ownership does not exist; an exchange unit configured to exchange cash or crypto currency of a user into token for paying a price for the share according to the contract; a payment unit configured to pay the price for the share by using the exchanged token; and a ownership transfer registration unit configured to register ownership transfer by constituting a register of the ownership transfer for the share, recording the constituted register with a blockchain, after the token is paid in return for the share.

Wherein the token comprises a first token used when each share of the common asset is first registered and a second token used when each registered share of the common asset is traded, the first token and the second token can be purchased with cash or crypto currency, the first token is not exchanged for cash or crypto currency, and the second token is exchanged for cash or crypto currency.

Wherein the share is traded in the order of contract, exchange, payment, and ownership transfer registration, and the trade is made in the order of contract, exchange, payment, and ownership transfer registration between other users once after the ownership transfer registration is performed.

The ownership transfer registration unit is characterized in comprising: an ownership transfer registration (OTR) composing unit configured to compose the ownership transfer registration by generating and configuring the register specifying the share purchased by a specific user when the specific user purchases the share of the common asset and performs the ownership transfer registration, an ownership transfer registration (OTR) endorsing unit configured to endorse the ownership transfer registration by requesting an endorsement of the ownership transfer registration by sending the configured register to at least one or more other blockchain nodes, an ownership transfer registration (OTR) confirmation unit configured to confirm the ownership transfer registration by confirming the register when the register is endorsed by the at least one or more other blockchain nodes, and an ownership transfer registration (OTR) execution unit configured to execute the ownership transfer registration by generating a block for the confirmed register and storing the generated block in at least one or more blockchain nodes by connecting the generated block with a previously generated block with a chain.

Wherein the block is characterized in comprising a hash value of a corresponding block hashed from the generated register, a hash value of the previous block connected to the chain, an address and an area of the share, a date of the ownership transfer registration for the share, and a user information for the user who trades the share.

The system for a blockchain-based share substantial trade is characterized in further comprising an exchange value evaluation unit configured to evaluate an exchange value between the token and crypto currency owned by the user who wants to purchase the share, and wherein the exchange unit further configured to exchange the crypto currency held by the user to the token based on the evaluated exchange value.

Wherein the common asset is characterized in comprising seized assets comprising movable and immovable properties whose owner cannot be specified, or ownership does not exist; planets comprising the moon or Mars whose owner cannot be specified, or ownership does not exist; or areas comprising the South Pole, the North Pole, deep-sea or out-sea of the Earth whose owner cannot be specified, or ownership does not exist.

Moreover, a method for a blockchain-based substantial trade of a share for an owner unspecified common asset is characterized in comprising: in a system for a blockchain-based substantial trade of a share for an owner unspecified common asset, contracting for a share among a plurality of shares split by the common asset of which an owner cannot be specified, or ownership does not exist; exchanging cash or crypto currency of a user into token for paying a price for the share according to the contract; paying the price for the share by using the exchanged token; and registering ownership transfer by constituting a register of the ownership transfer for the share, recording the constituted register with a blockchain, after the token is paid in return for the share, wherein the share is characterized in being traded in the order of contract, exchange, payment, and ownership transfer registration, and the trade is made in the order of contract, exchange, payment, and ownership transfer registration between other users once after the ownership transfer registration is performed.

Wherein, the token is characterized in comprising a first token used when each share of the common asset is first registered and a second token used when each registered share of the common asset is traded, the first token and the second token can be purchased with cash or crypto currency, the first token is not exchanged for cash or crypto currency, and the second token is exchanged for cash or crypto currency.

Wherein, the registering of the ownership transfer is characterized in comprising: configuring the ownership transfer registration by generating and configuring the register specifying the share purchased by a specific user when the specific user purchases the share of the common asset and performs the ownership transfer registration; endorsing the ownership transfer registration by requesting an endorsement of the ownership transfer registration by sending the configured register to at least one or more other blockchain nodes; confirming the ownership transfer registration by confirming the register when the register is endorsed by the at least one or more other blockchain nodes; and executing the ownership transfer registration by generating a block for the confirmed register and storing the generated block in at least one or more blockchain nodes by connecting the generated block with a previously generated block with a chain.

Wherein, the block is characterized in comprising: a hash value of a corresponding block hashed from the generated register, a hash value of the previous block connected to the chain, an address and an area of the share, a date of the ownership transfer registration for the share, and a user information for the user who trades the share.

Wherein, the method for a blockchain-based substantial trade is characterized in further comprising: in the system for a blockchain-based substantial trade of a share for an owner unspecified common asset, evaluating an exchange value between the token and crypto currency owned by the user who wants to purchase the share, wherein the exchanging of cash or crypto currency further configured to exchange the crypto currency held by the user to the token based on the evaluated exchange value.

Wherein, the common asset is characterized in comprising seized assets comprising movable and immovable properties whose owner cannot be specified, or ownership does not exist; planets comprising the moon or Mars whose owner cannot be specified, or ownership does not exist; or areas comprising the South Pole, the North Pole, deep-sea or out-sea of the Earth whose owner cannot be specified, or ownership does not exist.

Advantageous Effects

As described above, a system for a blockchain-based substantial trade of a share for an owner unspecified common asset and method therefor of the present inventive concept, have effect of performing substantial trade while receiving public confidence in the ownership from the public, by allowing parties to the trade use token to perform a transaction based on a blockchain and enabling the token used in the transaction to be exchanged for cash, with respect to the share of the common asset that an owner cannot be specified or an ownership does not exist.

MODES FOR THE INVENTIVE CONCEPT

Hereinafter, preferred embodiments of a system for a blockchain-based substantial trade of a share for an owner unspecified common asset and method therefor of the present inventive concept are described in detail with reference to the accompanying drawings. The same reference numerals indicate the same elements in each drawing. In addition, specific structural or functional descriptions for the embodiments of the present inventive concept are only exemplified for the purpose of describing the embodiments according to the present inventive concept, unless defined otherwise, all terms used herein, including technical or scientific terms, have the same meaning as commonly understood by one of ordinary skill in the art to which the present inventive concept belongs. Terms such as those defined in a commonly used dictionary should be interpreted as having a meaning consistent with the meaning in the context of the related art, unless defined herein the present specification, it is desirable not to be interpreted in an idealistic or overly formal sense.

Figure 1:
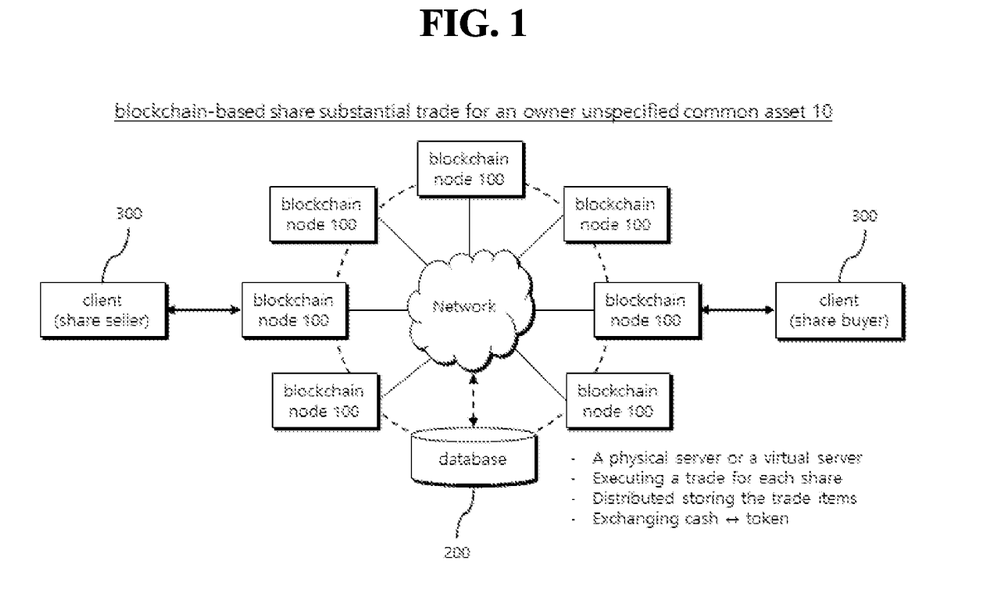
FIG. 1 shows a diagram for explaining a configuration of a system for a blockchain-based substantial trade of a share for an owner unspecified common asset in accordance with an embodiment of the present inventive concept.

FIG. 1 shows a diagram for explaining a configuration of a system for a blockchain-based substantial trade of a share for an owner unspecified common asset in accordance with an embodiment of the present inventive concept.

As shown in FIG. 1, a system 10 for a blockchain-based substantial trade for a share of a common asset of the present inventive concept is configured to comprise a plurality of blockchain nodes 100, a plurality of databases 200, and a plurality of client terminals 300.

Each of the plurality of blockchain nodes 100 allows trading parties to perform a transaction using token for a share in a common asset whose owner cannot be specified or whose ownership does not exist. For example, when a specific user purchases and registers a share of a common asset or he wants to trade the above share to other users after performing registration, each of the plurality blockchain nodes 100 enables the transaction to be performed through the token.

Wherein, the common asset may comprise a planet comprising the Moon or Mars, or an area comprising the Earth's Antarctic, Arctic, deep sea, or out-sea. If the government shall not claim ownership of the seized asset, the common asset may comprise seized asset including movable and real estate provided by the government freely to the public. Wherein anybody shall not claim the ownership of the common assets in the beginning.

In particular, when the common assets are seized assets including movables and real estate that are seized by customs or seized due to tax evasion, when the government intends to publicly sell the confiscated assets freely to the public, each user can acquire a share in the seized asset and transact the seized goods with other people through the system for a blockchain-based substantial trade for a share of a common asset according to the present inventive concept. Wherein anybody shall not claim the ownership of the seized assets.

Wherein, the common asset is split into a plurality of shares in the blockchain node 100 and stored and managed in the common asset database 210, the system enables a user to retrieve share information for which ownership is not set or share information to be sold to other users from the ownership information database 220 and provides the information to each user, and allows each user to perform a transaction on the share.

Wherein, the token is a cryptocurrency used inside the system when each user firstly registers a share of a common asset, or when each user trades each of the registered shares of the common asset, which is a major constituent feature of the present inventive concept, a first token and a second token are separately used in the present inventive concept. The first token is used when each user first registers the share of the common asset, users can purchase the first token with their own cash or cryptocurrency, but they cannot exchange the first token for cash or cryptocurrency. In addition, the second token is used when each user trades the registered share of the common asset, users can purchase the second token with their own cash or cryptocurrency, and the user who has secured the second token can exchange the second token for cash or cryptocurrency after the transaction for the share of the common asset is performed (refer to FIG. 3 and FIG. 4).

When an ownership transfer according to the transaction of the share registered in each of the plurality of blockchain nodes 100, each of the plurality of blockchain nodes 100 generates a block including information about the ownership transfer registration, connects the generated block with a previously generated block with a chain, propagates and shares the connected block to other blockchain nodes, and thereby allowing public confidence in the ownership of the share to be recognized.

Each of the plurality of blockchain nodes 100 can play a role to form a blockchain through a network, and at the same time, can play a role of a substantial trade platform for a share of a common asset in the blockchain-based substantial trade system for a share of a common asset.

Each of the plurality of blockchain nodes 100 may be configured as a physically independent system or may be configured as a virtual node. For example, after virtualizing a server by dividing a physically existing single server into two servers (i.e., one is physical and the other is virtual), two blockchain nodes 100 can be composed. At this time, the virtualized blockchain node 100 must also be able to designate the location of the corresponding blockchain node corresponding to designating the location with an independent IP address.

When each of the plurality of blockchain nodes 100 performs a substantial trade for a share in a common asset whose owner cannot be specified or whose ownership does not exist, it is desirable to configure the register necessary for ownership transfer registration and the functions necessary for a block generation at the same time. In addition, each of the plurality of blockchain nodes 100 provides a user interface necessary for the ownership transfer registration to each client 300 through a web server according to the substantial trade for the share of the common asset.

Each of the plurality of blockchain nodes 100 manages a membership, an account, authentication (password), etc. of each user accessing the blockchain, and plays a role of a platform to allow each user to manage his own electronic wallet or credit. The blockchain-based substantial trade system for a share of a common asset of the present inventive concept is configured to perform its manager function in each blockchain node 100, and shares the managing result to the plurality of blockchain nodes 100 in real time. If each client 300 connects to each blockchain node 100 and performs actions necessary for ownership transfer of the share, each client 300 can accordingly receive membership service, authentication service, account management service, and electronic wallet charging service of each user.

Each of the plurality of blockchain nodes 100 is interconnected to each other through a network, the plurality of blockchain nodes 100 and each client 300 can be interconnected through the Internet or intranet, and each user including an administrator of the blockchain nodes can access each of the plurality of blockchain nodes. In addition, each of the blockchain nodes 100 can have a structure that does not have to require excessive expansion of infrastructure for the blockchain nodes through connecting more than a certain number of physical servers, by creating and permanently managing multiple virtual blockchain nodes within one physical blockchain node, not having a very large number of physical blockchain nodes.

The database 200 comprises a common asset database 210 that stores the information related to splitting the common asset into a plurality of shares, separately by each of common assets, an ownership information database 220 storing the ownership information (i.e., item regarding ownership transfer registration) for each share of each common asset, a blockchain database 230 storing information related to the blockchain, and a management database 240 storing management information related to ownership transfer registrants, authentication, accounts, electronic wallets, applications, etc. (refer to FIG. 2).

The client 300 is a program installed in a user terminal (e.g., a smart phone, a tablet, etc.) so that each user such as an ownership registrant of the share, a person who wants to register ownership transfer through a substantial trade with the user holding the above share, and an administrator, can access the blockchain node 100. Each user accesses to the blockchain node 100 based on a web, performs a substantial trade on the share of the common asset, and receives the result of the completed ownership transfer registration delivered by connecting to another blockchain nodes 100 through the blockchain. That is, when a user who wants to register ownership transfer through a substantial trade for a specific share of the common asset performs a contract for the specific share with the blockchain nodes 100, then pays a predetermined amount of the payment after exchanging the predetermined amount into tokens, the blockchain node 100 registers a specific share traded by the user as a blockchain and provides the registered result to the client 300.

Hereinafter, a blockchain-based substantial trading process for a share of a common asset in a blockchain node is described in detail with reference to FIG. 2.

Figure 2:
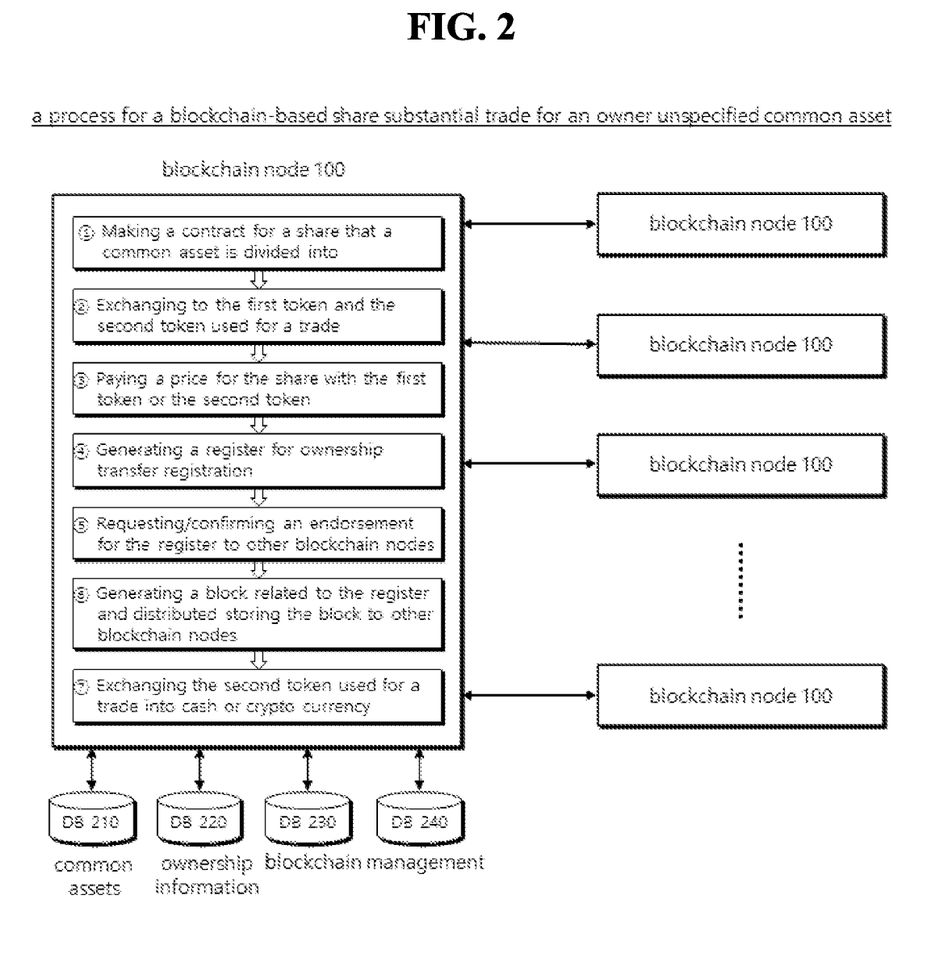
FIG. 2 shows a diagram for explaining a flow of a substantial trading process for a blockchain-based share of a common asset applied to the present inventive concept.

FIG. 2 shows a diagram for explaining the flow of a substantial trading process for a blockchain-based share of a common asset applied to the present inventive concept.

As shown in FIG. 2, the blockchain node 100 is configured to perform contract, exchange, payment, and ownership transfer registration (OTR) for trading a share of a common asset. That is, a user performs a trade in the order of contract, currency exchange, payment, and ownership transfer registration for a specific share of the common asset through the client 300, and it is possible for the user to perform a trade with another user in the same manner after completing the ownership transfer of the specific share.

More specifically, when a specific user searches for registration conditions or sales conditions in relation to each of a plurality of shares split from a common asset through the client 300, the blockchain node 100 provides the client 300 with information on registration conditions or sales conditions for each share requested by the user. That is, the blockchain node provides the information such as a location and a price of each share of the common asset to be first registered or to be performed ownership transfer between users. At this time, the information on shares to which no ownership is assigned or the information on ownership transfer registration for a specific share is retrieved from the ownership information database 220 and provided to the user.

The blockchain node 100 is configured to perform a contract to purchase a specific share according to the request of the user who has confirmed the registration conditions or sales conditions for each share of the common asset (①).

For example, the blockchain node 100 makes a contract between the system and the user in the case of a first registration for a specific share, and a contract is made between each users who are trading party in case of shares whose ownership transfer registration has been completed.

At this time, the contract is established by the user who purchases the specific share confirming the registration conditions or sales conditions and signing the conditions in the blockchain node 100, and the contract conditions are recorded through scripts, data structures, programs, metadata, etc.

When a contract for the specific share is made, the blockchain node 100 identifies the user's account and electronic wallet stored in the management database 240, and thus confirms the token to be used for transaction of the share, if a corresponding user does not have enough tokens, the user is requested to perform a token replenishment, and the blockchain node 100 allows the user to exchange the token by using cash or cryptocurrency (②).

That is, when a user registers a specific share for the first time, it is exchanged for the first token, when a specific registered share is traded, it is exchanged for a second token. At this time, since the first token is not exchanged into cash or cryptocurrency, it is desirable to be able to purchase the first token corresponding to the price of the specific share in the side of the blockchain node 100 side when a user registers the specific share for the first time, accordingly it is unnecessary for the user to purchase the first token in advance.

The blockchain node 100 pays the price for the specific share that performed the contract with the first token or the second token provided by the user (③).

When the payment is paid for a trade of a specific share by the user, the blockchain node 100 proceeds with ownership transfer registration for the specific share.

The process of ownership transfer registration is configured to perform a composition of the ownership transfer registration (OTR), endorsement of the ownership transfer registration (OTR), confirmation of the ownership transfer registration (OTR), execution of the ownership transfer registration (OTR), monitoring of the ownership transfer registration (OTR), or a combination thereof.

An ownership transfer registration is described in detail as follows. The blockchain node 100 generates a register for the ownership transfer registration for the specific share at once the payment for the specific share for which the contract is made is completed (④). At this time, the register comprises the position of the share, a lot number that is the identifier of the share, user information, and the like.

After the register is generated, the blockchain node 100 transmits the register to other blockchain nodes to request an endorsement of the ownership transfer registration for the specific share, and the endorsement of the ownership transfer registration is verified based on the results of the endorsements received from other blockchain nodes (⑤).

That is, according to the endorsement request of the ownership transfer registration for the specific share of the blockchain node 100, the blockchain nodes participating in the ownership transfer registration endorsement check whether the contents of the register violate or not the pre-established principle of the ownership transfer registration, and transmits the checking result to the blockchain node 100 that requested the endorsement of the ownership transfer registration, and the blockchain node 100 confirms the ownership transfer registration if there is no problem found in the endorsement result of the ownership transfer registration received from other blockchain nodes.

At this time, the endorsement of the ownership transfer registration is described using the signature of the blockchain node with the endorsement function, and suitable signatures for the same contents from all blockchain nodes in the corresponding set. should be received after designating the set of other blockchain nodes participating in the endorsement.

In addition, if the endorsement of the ownership transfer registration for a specific share is confirmed, the blockchain node 100 generates a block for the register of specific the share whose endorsement is confirmed from other blockchain nodes, and executes the ownership transfer registration for the specific share of a common asset by linking the generated block with the previously generated block in a chain and storing the chained block distributed in other blockchain nodes (⑥).

That is, the execution of the ownership transfer registration is to perform a process agreeing on the ownership transfer registration by using a blockchain. The result as which the ownership transfer registration is executed is stored in a plurality of blockchain nodes in distribution. The contents recorded in the block become a basic data for a trade of the share, and the execution of the ownership transfer registration comprises forming a blockchain by independently distributing blocks for each group of contracting parties and storing the blocks in a blockchain network composed of a plurality of blockchain nodes.

At this time, the block comprises a hash value of a corresponding block that hashed the generated register, a hash value of the previous block connected to the chain, an address and area for the share, the date of registering the ownership transfer for the share, and the user information who trades the share.

In addition, the blockchain node 100 may additionally perform a function of monitoring whether there is any violation of a condition, in the process of registration of transfer of ownership, not all blockchain nodes need to have this monitoring function.

As such, when the transaction for the specific share of the common asset is terminated, the blockchain node 100 exchanges the second token used for the transaction into cash or crypto currency according to the request of the user who sold the specific share (⑦).

Next, the use of tokens used for the transaction of blockchain-based shares of a common asset in the blockchain node will be described in detail with reference to FIG. 3 and FIG. 4.

Figure 3:
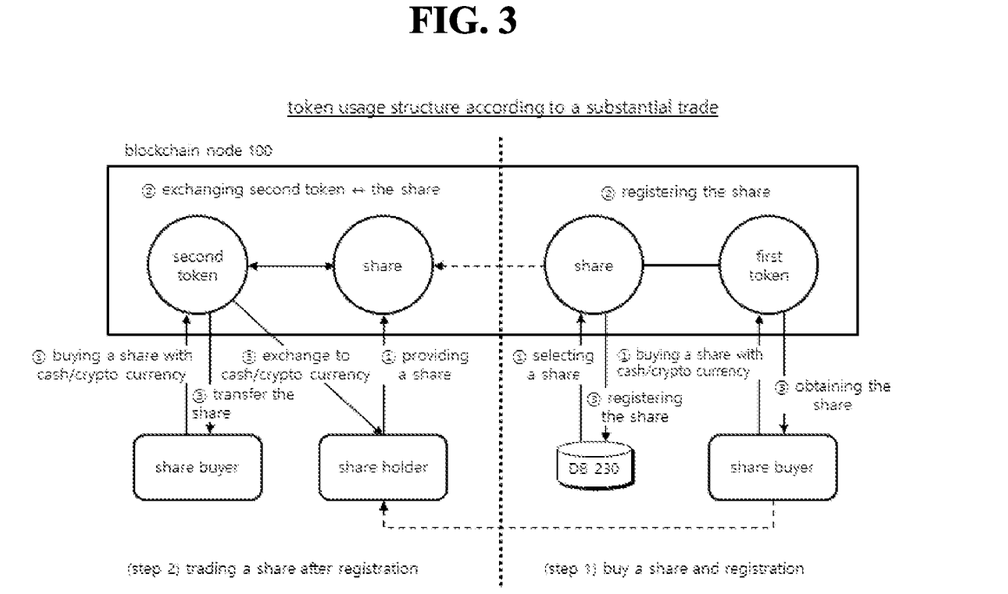
FIG. 3 shows a view for explaining a flow of a token usage process according to the substantial trade for a blockchain-based share of a common asset applied to the present inventive concept.
Figure 4:
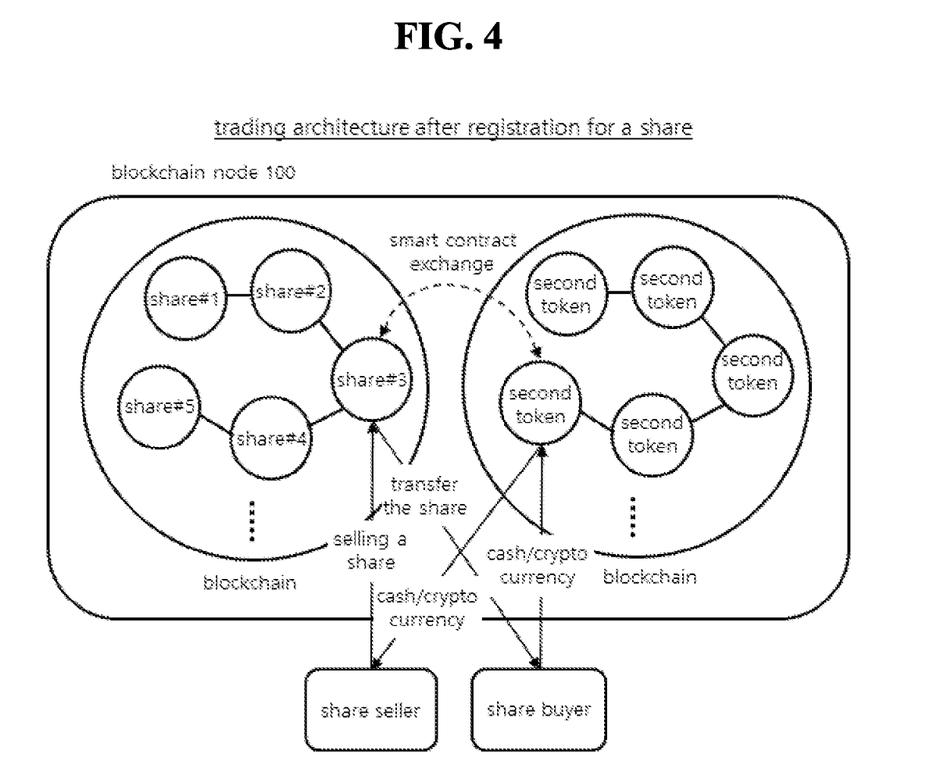
FIG. 4 shows a diagram for explaining a structural flow of a trade after registering for a blockchain-based share of a common asset applied to the present inventive concept.

FIG. 3 shows a view for explaining the flow of a token usage process according to the substantial trade for a blockchain-based share of a common asset applied to the present inventive concept, and FIG. 4 shows a diagram for explaining the structural flow of a trade after registering for a blockchain-based share of a common asset applied to the present inventive concept.

Each share of a common asset is transacted through a token issued by the system of the present inventive concept.

The dualized use of the tokens by dividing into the first token used to initially register each share and the second token used for trading between users for each registered share is described as an example in the present inventive concept.

As it is one of major features of the technical configurations of the present inventive concept, in the present inventive concept, the uses of the first token and the second token are clearly defined. That is, the first token can be used only when first registering each of a plurality of shares into which the common asset is split, the first token cannot be used directly for transactions between users. In addition, the second token can be used when performing a transaction between users for each share that has already been registered, the second token can not be used when registering each share of the above common asset for the first time.

The present inventive concept is not limited to the structure that the use of the tokens is dualized with a first token and a second token, and it should be noted that cash or crypto currency can be used directly for the initial registration of each share or for the transaction of each share between users.

In addition, the restrictions that the first token cannot be exchanged for cash and the second token can be exchanged for cash, may be set.

When described in more detail by referring to FIG. 3, the present inventive concept can be divided into a first step of performing purchase and registration of a specific share, and a second step of performing a transaction between users of a specific share for which registration has been made.

First of all, the first step of purchasing and registering a specific share is described in detail. a user (i.e., a share purchaser) for first registering each of a plurality of shares split from a common asset purchases a first token with cash or crypto currency through an exchange on the blockchain node 100. That is, the first token corresponding to the price of a specific share for performing the initial registration is purchased. At the same time, a share is selected from the database 230 in which the share is stored as a blockchain (①).

As such, after a share buyer purchases the first token with cash or crypto currency, a share is selected and the cost for the selected share is paid to the system with the first token, then the blockchain node 100 processes the initial ownership transfer registration of the specific share to the share buyer (②), accordingly, a share purchaser will secure the specific share that he/she has purchased. In addition, at the same time, the share registration items are registered in the share database 230 (③).

In the first step for the purchase and registration of the share, the share purchaser becomes the share holder for the transaction of the shares after registration in the second stage. Next, the second step of performing a transaction between users of each share of the registered common asset is described in detail, The share buyer purchases the second token with his possessed cash or crypto currency through the exchange center on the blockchain node 100. That is, he purchases the second token to be used for the purchase of the specific share that has been registered. At the same time, the share holder provides his own share. This situation is performed through a smart contract (①).

After that, when the share buyer pays the second token he owns to the system for the share provided by the share holder, the blockchain node 100 processes the exchange center of the second token and the corresponding share (②), and the blockchain node 100 processes an ownership transfer registration of the specific share from the share holder (seller) to a share purchaser, and accordingly, the share purchaser receives a specific share (③).

At the same time, the share holder (seller) who has sold a specific share he or she owns can withdraw the second token secured according to the transaction through the exchange center on the blockchain node 100 by exchanging the second token into cash or crypto currency (③).

As explained by referring to FIG. 4, assume that a case that exchanges a share (e.g., share #3) that a specific share seller possesses with a second token held by the share buyer through a smart contract, under the states that multiple shares are connected by a blockchain. Of course, it is possible to exchange a plurality of different shares and a plurality of second tokens with each other according to the market price of the shares.

When the share buyer performs a smart contract with the share seller who holds share #3, and then pays for the value of share #3 with the second token in order to execute the contract, the blockchain node 100 processes an ownership transfer registration through the blockchain by transferring the share #3 held by the share seller to the share purchaser.

Thereafter, the share seller may exchange the second token paid by the share buyer according to the contract into cash or crypto currency through the exchange center on the blockchain node 100.

Wherein, a plurality of shares are connected to each other by a blockchain, and the second token is also connected to the blockchain. In the end, trading the share is exchanging the share with the second token, and thus this means of such an exchange is ultimately to update and correct the records of the blockchain. For example, the blockchain node 100 can update the owner from the share seller to the share buyer in the record of share #3, and change the record of the blockchain even for the second token. Exchanging the second token to cash or other crypto currency is to convert the second token into cash or other crypto currency at the exchange center and provide the cash or other crypto currency to the share seller.

Figure 5:
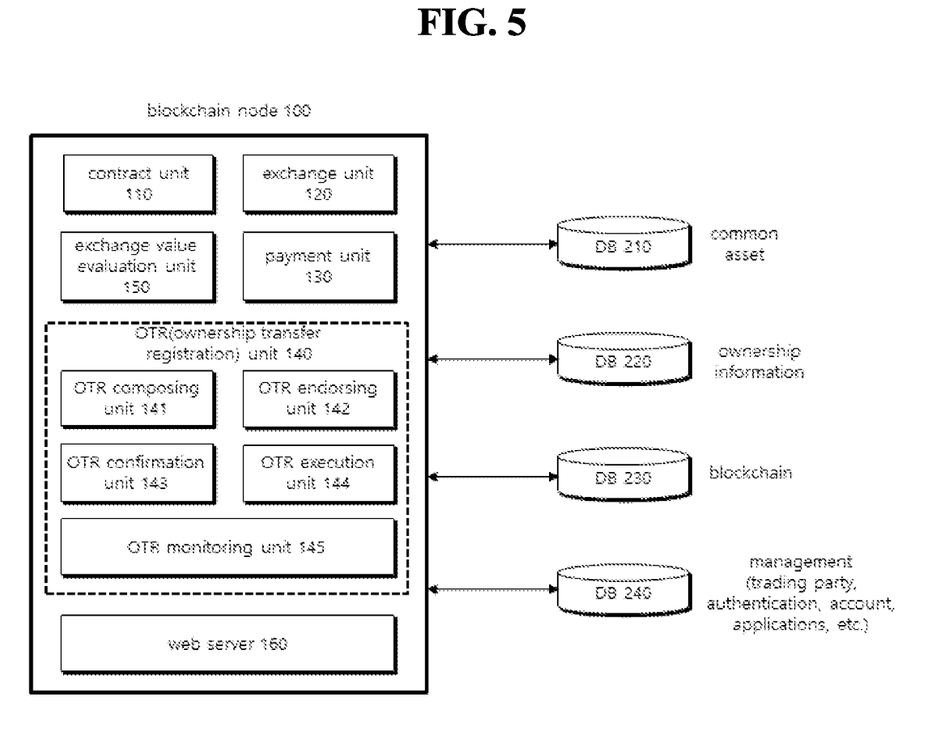
FIG. 5 shows a block diagram showing in detail a configuration of a blockchain node in accordance with an embodiment of the present inventive concept.

FIG. 5 shows a block diagram showing in detail a configuration of a blockchain node in accordance with an embodiment of the present inventive concept.

As shown in FIG. 5, the blockchain node 100 comprises a contract unit 110, an exchange unit 120, a payment unit 130, an ownership transfer registration (OTR) unit 140, an exchange value evaluation unit 150, a web server 160, etc.

The contract unit 110 is configured to perform a contract between the transaction parties for each share of a common asset, which is split into a plurality of shares and of which owner cannot be specified or ownership does not exist.

That is, a user performs initial registration through the client 300 or confirms in advance the information such as the location and price of a specific share that an ownership is to be transferred between users, then selects the specific share to purchase, and makes a contract.

At this time, the above contract is made between the system and the user in the case of initial registration of a specific share. In the case of a share whose ownership transfer registration has been completed, the contract is made between each user, and once a contract for the sell and purchase of a certain share is made, the contract cannot be canceled.

The exchange unit 120 is configured to perform a function of exchanging the cash or crypto currency that a user owns into tokens for payment of a price for a contract made through the contract unit 110. That is, the exchange unit 120 plays a role of an exchange center that exchanges into the first token used for initial registration of each share in the common asset or into the second token used for trading each share of the registered common asset.

In addition, the exchange unit 120 provides a service so that a user who has ownership of a specific share can exchange and withdraw the second token obtained while selling to another user into cash or crypto currency.

The payment unit 130 is configured to pay a price for executing a contract for an ownership transfer of a specific share by using the first token or the second token exchanged through the exchange unit 120, after making contract for the ownership transfer of a specific share (that is, a contract for first registering each share of the common asset or a contract for transacting each registered share). That is, the payment unit 130 is configured to pay the first token or the second token corresponding to the price of corresponding share from the e-wallet of the share buyer to the e-wallet of the share seller.

The ownership transfer registration unit 140 is configured to play a role of completing the ownership transfer registration to a corresponding user by recording the register for a specific share in a blockchain, when a user who wants to purchase the specific share pays a price in return for the specific share with token.

That is, when the ownership transfer registration (OTR) unit 140 processes an ownership transfer registration for the specific share, the ownership transfer registration unit 140 is configured to generate a block for the register, connect the generated block and the previously generated block with a chain, propagate and share the block to other blockchain nodes, and thus allowing public confidence to be recognized in the ownership transfer registration for the specific share.

When a specific user purchases the above share and wants to register ownership transfer registration, the ownership transfer registration unit 140 is further configured to comprise an ownership transfer registration composing unit 141 which configures to generate a register specifying a share purchased by a specific user, an ownership transfer registration endorsing unit 142 that requests an endorsement of the register by sending the configured register to at least one or more than one of the other blockchain nodes, an ownership transfer registration confirmation unit 143 that confirms the register which is endorsed from the at least one or more than one of the blockchain nodes, an ownership transfer registration execution unit 144 that generates a block for the confirmed register, connects the generated block to the previously generated block in a chain, distributes and stores the blockchain in the at least one or more blockchain nodes, and an ownership transfer registration monitoring unit 145 that plays a role of monitoring whether there is any violation of the condition when performing a composition of the ownership transfer registration, an endorsement of the ownership transfer registration, a confirmation of the ownership transfer registration, and an execution of the ownership transfer registration, etc.

The exchange value evaluation unit 150 is configured to play a role of evaluate the exchange value when the crypto currency is exchanged for the first token or the second token through the exchange unit 120 in case that a user who wants to purchase the specific share holds a crypto currency other than cash. In this case, the evaluation of the exchange value may be performed through the confirmation of the price currently being traded through the exchange center of corresponding crypto currency. Then, the exchange unit 120 is configured to exchange the crypto currency held by the user into the token based on the result evaluated by the exchange value evaluation unit 150.

At this time, the exchange value evaluation unit 150 does not have to be configured, when exchanging with the token in the system, in case of implementing a service for only cash.

The web server 160 makes the client device that wants to access the blockchain node 100 connect to the blockchain node as a web-based connection so that a desired service can be provided. In this case, the client device remotely accesses the blockchain node 100 and requests a contract related to the ownership transfer registration, receives notification for the result of the ownership transfer registration, and in addition, can search the status of the ownership transfer registration for each share through the blockchain.

In addition, the web server 160 is configured to store and manage the membership, authentication, and account of each user who accesses the blockchain node 100, in the management database 240, moreover, also plays a role of a platform through which a user manages his e-wallet and credit. Accordingly, each user can receive services such as membership, authentication, account management, electronic wallet charging, etc. through the web server 160. To this end, the web server 160 is linked with each user's crypto currency as well as a bank account or credit card, and can also handle coupon, cash, jewelry, etc. by issuing an exchange ticket.

On the other hand, the platform according to the present inventive concept can be configured to limit the basic requirement of a blockchain platform that an unauthorized party must check the blockchain ledger to verify the identity and transaction pattern of all parties in the network, restrict access to some information for unauthorized parties, and thereby ensuring the anonymity of the ownership transfer registration for each share in a common asset between the stakeholders.

Next, an embodiment of a method for a blockchain-based substantial trade for a share of an ownership unspecified common asset according to the present inventive concept as configured above is described in detail with reference to FIG. 6. At this time, the order of each step according to the method of the present inventive concept may be changed by the environment of use or by those who skilled in the art.

Figure 6:
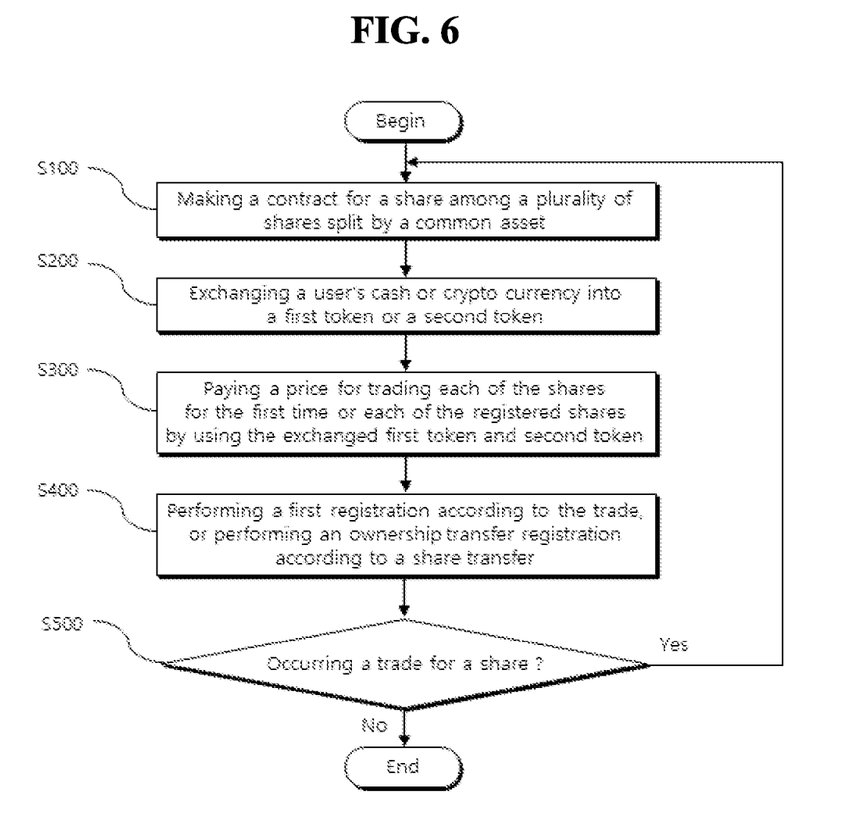
FIG. 6 shows a flowchart for explaining an operational process of a method for a blockchain-based substantial trade of a share for an owner unspecified common asset in accordance with an embodiment of the present inventive concept.

FIG. 6 shows a flowchart for explaining the operational process of a method for a blockchain-based substantial trade of a share for an owner unspecified common asset in accordance with an embodiment of the present inventive concept.

As shown in FIG. 6, the blockchain node 100 is configured to perform a contract for each of a plurality of shares split from a common asset whose owner cannot be specified or whose ownership does not exist, according to the request of the client 300 accessed through the web server (S100).

That is, if it is the first registration for a specific share, a contract between the system and a user is made, and if an ownership transfer of the specific share is registered, a contract is made between each of users who are transaction parties.

When a contract for a specific share is made through S100, the blockchain node 100 performs exchanging the user's cash or crypto currency into a first token or a second token in order to pay the price of the contract (S200), and the blockchain node 100 performs registering the specific share for the first time or paying a price for trading each registered share using the exchanged first token or second token (S300).

Then, the blockchain node 100 performs the first registration according to the trade of the share, or registering an ownership transfer according to the share transfer using the first token or the second token (S400).

After performing the ownership transfer registration for the specific share through S400, the blockchain node 100 determines whether a trade for the ownership transfer registration of the specific share is additionally generated (S500).

As a result of the determination in S500, if a transaction for the ownership transfer registration of a specific share occurs, the blockchain node 100 repeatedly performs after S100 and terminates the service when there are no more transactions.

On the other hand, when the blockchain node 100 exchanges a user's cash or crypto currency to the first token or the second token through S200, If a corresponding user has crypto currency other than cash, the blockchain node 100 can be configured to further perform evaluating the exchange value between the token and the crypto currency held by the user who wants to purchase a specific share, and exchanging the crypto currency held by the user to the token based on the evaluation result.

Figure 7:
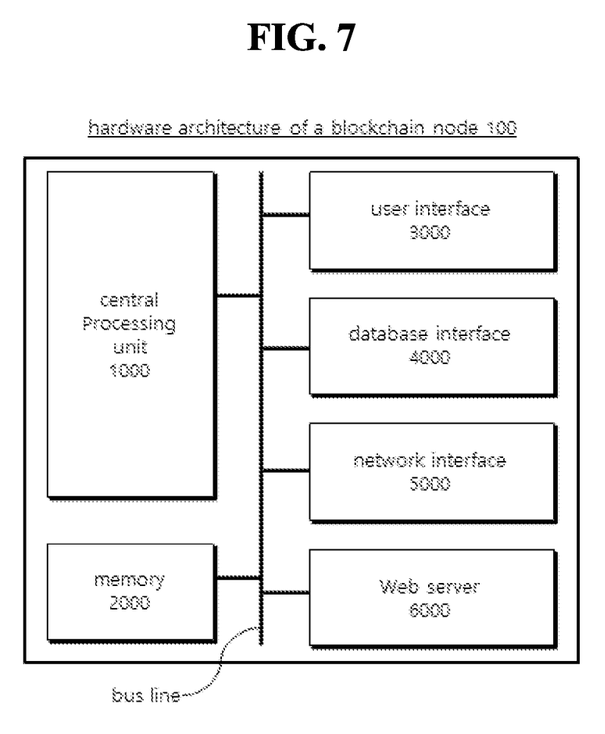
FIG. 7 shows a diagram viewing a hardware architecture of a blockchain node in accordance with an embodiment of the present inventive concept.

FIG. 7 shows a diagram viewing a hardware architecture of a blockchain node in accordance with an embodiment of the present inventive concept.

As shown in FIG. 7, the hardware architecture of the blockchain node 100 is configured to comprise a central processing unit (i.e., a processor) 1000, a memory 2000, a user interface 3000, a database interface 4000, a network interface 5000, a web server 6000, etc.

The user interface 3000 is configured to provide input and output interfaces to the user by using a graphical user interface (GUI).

The database interface 4000 is configured to provide an interface between a database and the hardware of the blockchain node. The network interface 5000 is configured to provide a network connection between devices owned by a user.

The web server 6000 is configured to provide a tool for a user to access the hardware of the blockchain node via a network. Most users can remotely access the web server (i.e., web-based access) and use the blockchain node 100.

The above-described configuration or each step of method may be implemented as computer-readable code on a computer-readable recording medium or transmitted through a transmission medium. The computer-readable recording medium is a data storage device capable of storing data that can be read by a computer system.

Examples of computer-readable recording media include, but are not limited to, a databases, ROMs, RAMs, CD-ROMs, DVDs, magnetic tapes, floppy disks, and optical data storage devices. The transmission medium may include a carrier transmitted through the Internet or various types of communication channels. In addition, the computer readable recording medium may be distributed through a network coupled computer system so that the computer readable code is stored and executed in a distributed manner.

In addition, at least one or more components applied to the present inventive concept may include or be implemented by a processor such as a central processing unit (CPU), a microprocessor, etc. that perform each function of the components, and two or more of the components may be combined into a single component to perform all operations or functions for the combined two or more components. In addition, a part of at least one or more components applied to the present inventive concept may be performed by other components among these components. In addition, communication between the components may be performed through a bus (not shown).

In the above description, while preferred embodiments according to the present inventive concept have been mainly described, the technical idea of the present inventive concept is not limited thereto, and each component of the present inventive concept may be changed or modified within the technical scope of the present inventive concept to achieve the same purpose and effect.

In addition, although preferred embodiments of the present inventive concept have been illustrated and described above, the present inventive concept is not limited to the specific embodiments described above, and of course various modifications can be made by those of ordinary skill in the art to which the invention pertains without departing from the essential points of the invention as claimed in the claims, and these variant implementations should not be understood separately from the technical idea or prospect of the present inventive concept.

Since the present inventive concept performs a trade based on a blockchain using tokens by the trading parties for a share of a common asset, and the tokens used in the above trade can be exchanged for cash, a substantial trade can be performed while receiving public confidence in the ownership from the public with respect to a share of a common asset.

What is claimed is:

1. A computer-implemented system for executing a blockchain-based substantial trade of a share for an owner unspecified common asset including the moon or Mars whose owner cannot be specified or whose ownership does not exist, comprising:
    an ownership information database configured to store ownership transfer data for individual shares of the owner unspecified common asset;
    a blockchain database configured to store a share as a blockchain;
    a common asset database configured to store common asset split into a plurality of shares; and
    a plurality of blockchain nodes, wherein the plurality of blockchain nodes includes at least one physical blockchain node, and at least one virtual blockchain node within at least one physical blockchain node,
    wherein the at least one physical blockchain node comprises:
        a processor; and
        a memory storing program code executable by the processor,
    wherein the plurality of blockchain nodes each comprises a web server configured to provide a user interface to a client application executed on a user terminal, and
    wherein the at least one physical blockchain node is configured to create and manage the at least one virtual blockchain node, and wherein the at least one virtual blockchain node is configured to:
        receive, via the web server, a user request for information regarding shares to which no ownership is assigned, or shares eligible for ownership transfer registration based on registered prior ownership, retrieve the information from the common asset database and the ownership information database, and provide, via the web server, the information to the user interface of the client application on the user terminal;
        generate a contract with a program for trading a share, the contract comprising a structured data record of conditions of the contract with scripts or metadata for either a first registration of the share with a first token to be transferred from an electronic wallet of the user to the system, or a subsequent trade of a registered share with a second token to be transferred from the user as a share buyer to a current registered share holder;
        execute, by a program code associated with the contract, the contract based on a dualized independent usage of tokens, wherein the first token is paid from the electronic wallet of the user to the system in return for the first registration, and the second token is transferred from the share buyer to the share holder in return for subsequent trade, based on a dualized independent usage of tokens, in that the first token and the second token are purchased with cash or crypto currency for the first registration and the subsequent trade, respectively, the first token is set not to be exchanged back to cash or crypto currency by a manager through the user interface of the client, and the second token is exchanged to cash or crypto currency;

upon receipt of a token payment, generate a register specifying the traded share comprising a position of the traded share, a lot number that is an identifier of the traded share, and user information of the traded share;

transmit the register to a predefined set of other blockchain nodes to request endorsement, each node verifying the register by checking whether contents of the register violate or not pre-established principle of the ownership transfer registration;

upon receiving sufficient endorsements, confirm the ownership transfer, generate a new block including the confirmed register, append the block to the blockchain by including a hash of the previous block, and distribute the updated blockchain to each blockchain database in the network; and update the ownership information database to reflect the user as the new share holder based on the confirmed transaction.

2. The system of claim 1, wherein the processor is further configured to generate the block including:
a hash value generated from the confirmed register;
a hash value of a previous block connected to a blockchain;
an address and an area of the traded share;
a time indicating the date and time of completion of the ownership transfer registration for the traded share; and
user information of the share buyer and the current registered share holder,
wherein the generated block is propagated to at least one or more other blockchain nodes to be recorded in each blockchain database.

3. The system of claim 1, wherein the processor is further configured to:
monitor a violation of conditions for the generation, endorsement, confirmation and execution of the ownership transfer registration; and
upon detecting a violation of any condition of the ownership transfer registration, transmit, via the web server, information to cancel the contract to the user interface of the client application on each user terminal.

4. A computer-implemented method for executing a blockchain-based substantial trade of a share for an owner unspecified common asset, including the moon or Mars whose owner cannot be specified or whose ownership does not exist, in a system comprising:
an ownership information database configured to store ownership transfer data for individual shares of the owner unspecified common asset;
a blockchain database configured to store a share as a blockchain;
a common asset database configured to store common asset split into a plurality of shares; and
a plurality of blockchain nodes, wherein the plurality of blockchain nodes includes at least one physical blockchain node, and at least one virtual blockchain node within at least one physical blockchain node, wherein the at least one physical blockchain node comprises:
a processor; and
a memory storing program code executable by the processor,
wherein the plurality of blockchain nodes each comprises a web server configured to provide a user interface to a client application executed on a user terminal,
wherein the at least one physical blockchain node is configured to create and manage the at least one virtual node, the method comprising, on the at least one virtual blockchain node:
receiving, via the web server, a user request for information regarding shares to which no ownership is assigned, or shares eligible for ownership transfer registration based on registered prior ownership, retrieving, by the processor, the information from the common asset database and the ownership information database, and providing, via the web server, the information to the user interface of the client application on the user terminal;
generating a contract with a program, by the processor, for trading a share, the contract comprising a structured data record of conditions for the contract with scripts or metadata for either a first registration of the share with a first token to be transferred from an electronic wallet of the user to the system, or a subsequent trade of a registered share with a second token to be transferred from the user as a share buyer to a current registered share holder;
executing, by a program code associated with the contract, the contract based on a dualized independent usage of tokens, wherein the first token is paid from the electronic wallet of the user to the system in return for the first registration, and the second token is transferred from the share buyer to the share holder in return for subsequent trade, based on a dualized independent usage of tokens, in that the first token and the second token are purchased with cash or crypto currency for the first registration and the subsequent trade, respectively, the first token is set not to be exchanged back to cash or crypto currency by a manager through the user interface of the client, and the second token is exchanged to cash or crypto currency;
upon receipt of a token payment, generating, by the processor a register specifying the traded share comprising a position of the traded share, a lot number that is an identifier of the traded share, and user information of the traded share;
transmitting, by the processor, the register to a predefined set of other blockchain nodes to request endorsement, each node verifying the register by checking whether contents of the register violate or not pre-established principle of the ownership transfer registration;
upon receiving sufficient endorsements, confirming, by the processor, the ownership transfer, generating, by the processor, a new block including the confirmed register, appending, by the processor, the block to the blockchain by including a hash of the previous block, and distributing, by the processor, the updated blockchain to each blockchain database; and
updating, by the processor, the ownership information database to reflect the user as the new share holder based on the confirmed transaction.

5. The method of claim 4, wherein the method further comprising: generating the block including:
- a hash value generated from the confirmed register;
- a hash value of a previous block connected to a blockchain;
- an address and an area of the traded share;
- a time indicating the date and time of completion of the ownership transfer registration for the traded share; and
- user information of the share buyer and the current registered share holder,
- wherein the generated block is propagated to at least one or more other blockchain nodes to be recorded in each blockchain database.

6. The method of claim 4, wherein the method further comprises:
- monitoring, by the processor, a violation of conditions for the generation, endorsement, confirmation and execution of the ownership transfer registration; and
- upon detecting a violation of any condition of the ownership transfer registration, transmitting, by the processor, information to cancel the contract, via the web server, to the user interface of the client application on each user terminal.

* * * * *